US012778089B2

(12) United States Patent
Antonello et al.

(10) Patent No.: US 12,778,089 B2
(45) Date of Patent: Nov. 3, 2026

(54) EQUIPMENT AND METHOD FOR SEXING AND ANALYZING THE INDIVIDUAL CHARACTERISTICS OF BIRDS

(71) Applicants: Ricardo Antonello, Santa Catarina (BR); Gregori Harvey Antunes, Santa Catarina (BR); Luan Gustavo Schmidt, Santa Catarina (BR)

(72) Inventors: Ricardo Antonello, Santa Catarina (BR); Gregori Harvey Antunes, Santa Catarina (BR)

(73) Assignees: Ricardo Antonello, Santa Catarina (BR); Luan Schmidt, Santa Catarina (BR); Gregori Antunes, Santa Catarina (BR)

( * ) Notice: Subject to any disclaimer, the term of this patent is extended or adjusted under 35 U.S.C. 154(b) by 0 days.

(21) Appl. No.: 19/100,310

(22) PCT Filed: Apr. 2, 2024

(86) PCT No.: PCT/BR2024/050135
§ 371 (c)(1),
(2) Date: Jan. 31, 2025

(87) PCT Pub. No.: WO2024/207087
PCT Pub. Date: Oct. 10, 2024

(65) Prior Publication Data

US 2026/0041069 A1 Feb. 12, 2026

(30) Foreign Application Priority Data

Apr. 6, 2023 (BR) ..................... BR1020230065392

(51) Int. Cl.
*A01K 45/00* (2006.01)
*G06V 40/10* (2022.01)

(52) U.S. Cl.
CPC ............ *A01K 45/00* (2013.01); *A01K 45/005* (2013.01); *G06V 40/10* (2022.01)

(58) Field of Classification Search
CPC .............................. A01K 45/00; A01K 45/005
See application file for complete search history.

(56) References Cited

U.S. PATENT DOCUMENTS

2009/0000915 A1* 1/2009 Nadreau ................ A01K 45/00 198/469.1
2020/0315136 A1* 10/2020 Karimpour .......... A01K 13/003
(Continued)

FOREIGN PATENT DOCUMENTS

BR PI0721587 A2 1/2013
BR 112018009596 A2 11/2018

OTHER PUBLICATIONS

International Search Report, National Institute of Industrial Property (Brazil), Jun. 25, 2024.
(Continued)

*Primary Examiner* — Joshua D Huson
*Assistant Examiner* — Alanna K Peterson
(74) *Attorney, Agent, or Firm* — Bay State IP, LLC

(57) ABSTRACT

This invention, which belongs to the poultry farming sector, refers to equipment to transport birds along a conveyor belt system, and direct then to image capture heads These units are equipped with warm air blowers, warming the birds and causing them, at the same time, to open their wings just as they enter the head, which allows photographs to be taken for analysis. The place where the bird is located moves up and down as a unit, constantly, together with the blowers, which allows several images to be accurately captured. The operating system can then accurately identify individual
(Continued)

characteristics, such as possible malformations, absence of feathers at birth, unexpected coloration and, in particular, the sex of each bird.

9 Claims, 14 Drawing Sheets

(56) References Cited

U.S. PATENT DOCUMENTS

| | | | | |
|---|---|---|---|---|
| 2022/0132811 | A1* | 5/2022 | Mizrach | A61B 5/004 119/713 |
| 2022/0400655 | A1* | 12/2022 | Donval | B65G 47/14 |
| 2024/0099275 | A1* | 3/2024 | Ninet | A01K 41/023 |
| 2024/0284877 | A1* | 8/2024 | Boukamcha | A01K 45/00 |

OTHER PUBLICATIONS

Written Opinion, National Institute of Industrial Property (Brazil), Jun. 25, 2024.

* cited by examiner

EQUIPMENT AND METHOD FOR SEXING AND ANALYZING THE INDIVIDUAL CHARACTERISTICS OF BIRDS

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/BR2024/050135 filed on Apr. 2, 2024, and which in turn claims priority under 35 USC 119 to Brazilian Patent Application No. BR1020230065392 filed on Apr. 6, 2023, the contents of which are incorporated by reference herein in its entirety as part of the present application.

TECHNICAL SECTION FOR THE INVENTION

This invention, which belongs to the poultry farming sector, refers to equipment to transport birds along a conveyor belt system, and direct then to image capture heads. These units are equipped with warm air blowers, warming the birds and causing them, at the same time, to open their wings just as they enter the head, which allows photographs to be taken for analysis. The place where the bird is located moves up and down constantly, together with the blowers, as a unit, which allows several images to be accurately captured. The operating system can then accurately identify individual characteristics, such as possible malformations, absence of feathers at birth, unexpected coloration and, in particular, the sex of each bird.

STATE OF THE ART

Bird sexing analysis is a procedure that determines the sex of a bird, based on either genetic or morphological characteristics. There are several sexing analysis techniques available for birds, and the choice of technique depends on various factors, such as the bird's species, age, size and the type of sample available.

One of the most common techniques for bird sexing is DNA-based PCR (Polymerase Chain Reaction). This uses a specific set of primers to amplify the DNA of the sex chromosome that determines the sex of the bird. This technique generally uses blood, feather or tissue samples.

Another technique for bird sexing is plumage analysis, which is directly relevant to this application. This uses morphological characteristics to determine the bird's sex. The coloration and pattern of the plumage in some bird species differs between the sexes. This allows sex to be determined by visual observation. Obviously, this technique is not as accurate as DNA-based analysis.

Bird sexing is important in many areas of biology, such as biodiversity conservation, breeding in captivity and behavioral research. Determining the sex is fundamental in understanding the reproductive biology of birds, and can help inform management and conservation strategies for endangered species.

A large part of the poultry industry uses processes for sexing birds for several reasons, including: Sex selection, where females are often used for egg production, while males are often used for broiler meat production; Production efficiency, so that companies can optimize their resources and maximize production efficiency; Costs, although it is an additional cost, the sexing process is often considered necessary in order to maximize long-term profitability—as it avoids the need to separate them later, this can reduce associated labor and logistics costs; More effective quality control, ensuring that only high-quality chicks enter the production systems, which can help minimize health problems and maximize overall performance.

The use of male and female birds can vary, depending on the specific practices of the poultry farm and local regulations. After the sexing process, female birds are generally sent for rearing on farms that specialize in broiler chickens or egg-layers. They are reared until they reach the desired weight or for egg production and are then either slaughtered or continue laying eggs, respectively. Male birds, meanwhile, are reared for broiler meat. They are either fed and reared until they reach the ideal slaughter weight, or used for reproduction in poultry operations that have programs for this purpose. Some male birds may be chosen as breeders to produce offspring for further generations of commercial birds, or they may be culled. In some cases, especially in intensive commercial egg production operations, male birds may be culled shortly after the sexing process. This may involve euthanasia, by means of macerators or gas methods that ensure efficient disposal, while minimizing suffering.

All over the world, this process is done manually and workers need to be specifically trained for this purpose. There are basically two techniques in morphological sexing: one examines the set of primary and secondary feathers on the tips of the wings where the size configuration indicates the sex of the bird; the other techniques is based on the cloaca, but is not widely used.

Developing the skills to sex birds is a slow process, and it can take several months for workers to be able to perform it satisfactorily. It is also tiring and repetitive; some of the more skilled workers can examine 3,000 birds per hour in 8-hour shifts per day, for example.

It is also crucial in Poultry farming to be able to analyze the individual characteristics of the birds, for several reasons. Firstly, it is possible to identify potential health issues, such as malformation, illness or injury, which allows the farmer to make an early intervention and give appropriate treatment. Being able to analyze the bird's individual characteristics is also fundamental in breeding birds; it helps farmers to select the best specimens for reproduction and production.

However, there are significant issues with such analysis at present. Identifying specific characteristics visually is time consuming, especially for large flocks of birds, and often inaccurate. In addition, it can be difficult to detect certain features, such as internal malformations, without a detailed examination. The lack of automated and efficient methods for examining birds individually is also a limitation, which may result in data that is important for poultry management and production being underutilized.

New Features of this Invention

In the context of this situation, the implementation of a machine and method that can analyze the sex and individual characteristics of birds can provide a number of benefits to the poultry industry. This automated system, in addition to accurately determining the sex of each bird, is able to identify health issues, such as malformations, injuries or diseases, which allows for early intervention to ensure the welfare of the birds. The analysis also makes it easier to select the best specimens for reproduction, which helps to improve breeding in poultry programs. Furthermore, production can be more efficient and with better health conditions, as the development of the birds can be monitored over time and adapted according to their needs. The detailed analysis of individual characteristics contributes to quality assurance, by helping to produce more uniform batches that meet the standards required by consumer markets. Altogether, these benefits improve both the welfare of the birds and the efficiency and quality of poultry production, strengthening the position of companies in this sector.

This invention allows workers to be reallocated to other tasks and reduces their exposure to repetitive strain injuries, eye fatigue and spinal problems. It can increases the production capacity of the facility by allowing it to operate continuously, 24 hours a day. It makes the bird sexing process more effective and reduces operating costs, which increases the companies' profitability.

DESCRIPTION OF THE ATTACHED DRAWINGS

This invention must be able to be understood in full and any technician in this field must be able to put it into practice. Therefore, it should be clearly, concisely and sufficiently well described, based on the drawings that illustrate and support it, which are attached and listed below:

DETAILED DESCRIPTION OF THE INVENTION

Figure 1:
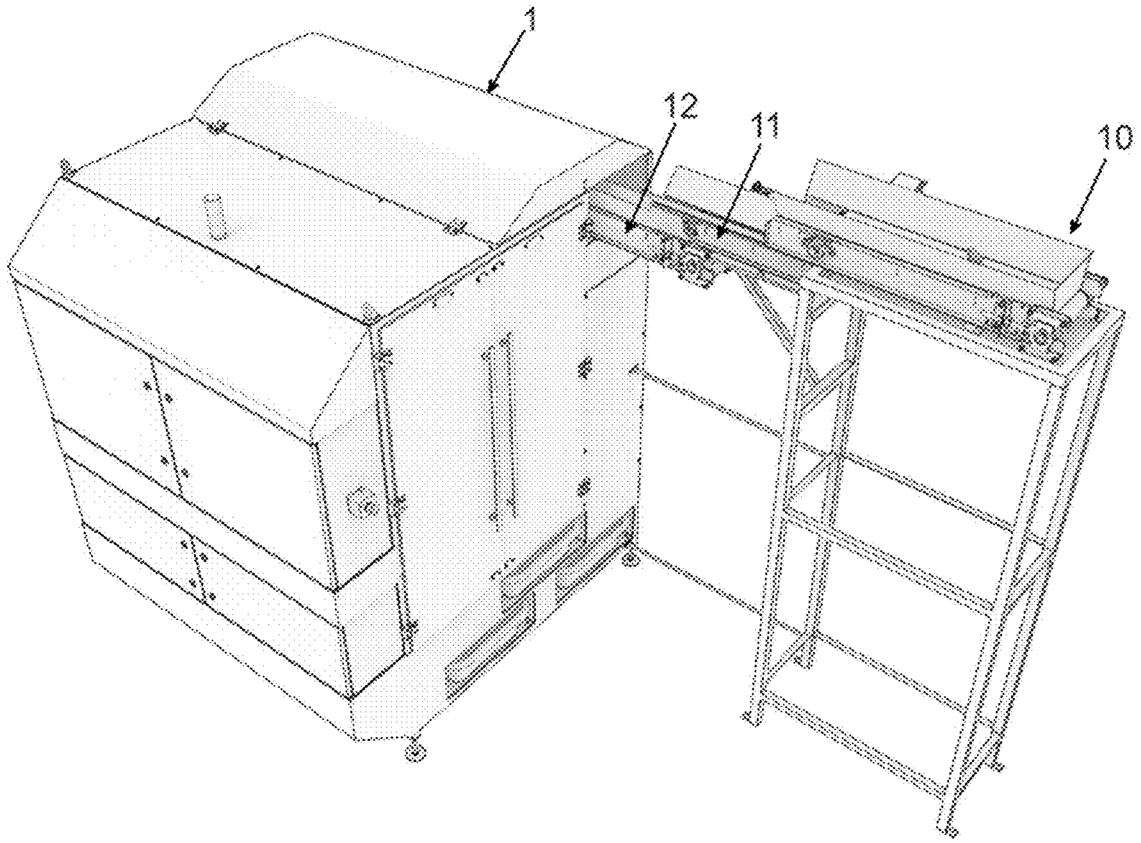
FIG. 1 shows a perspective view of the equipment.
Figure 2:
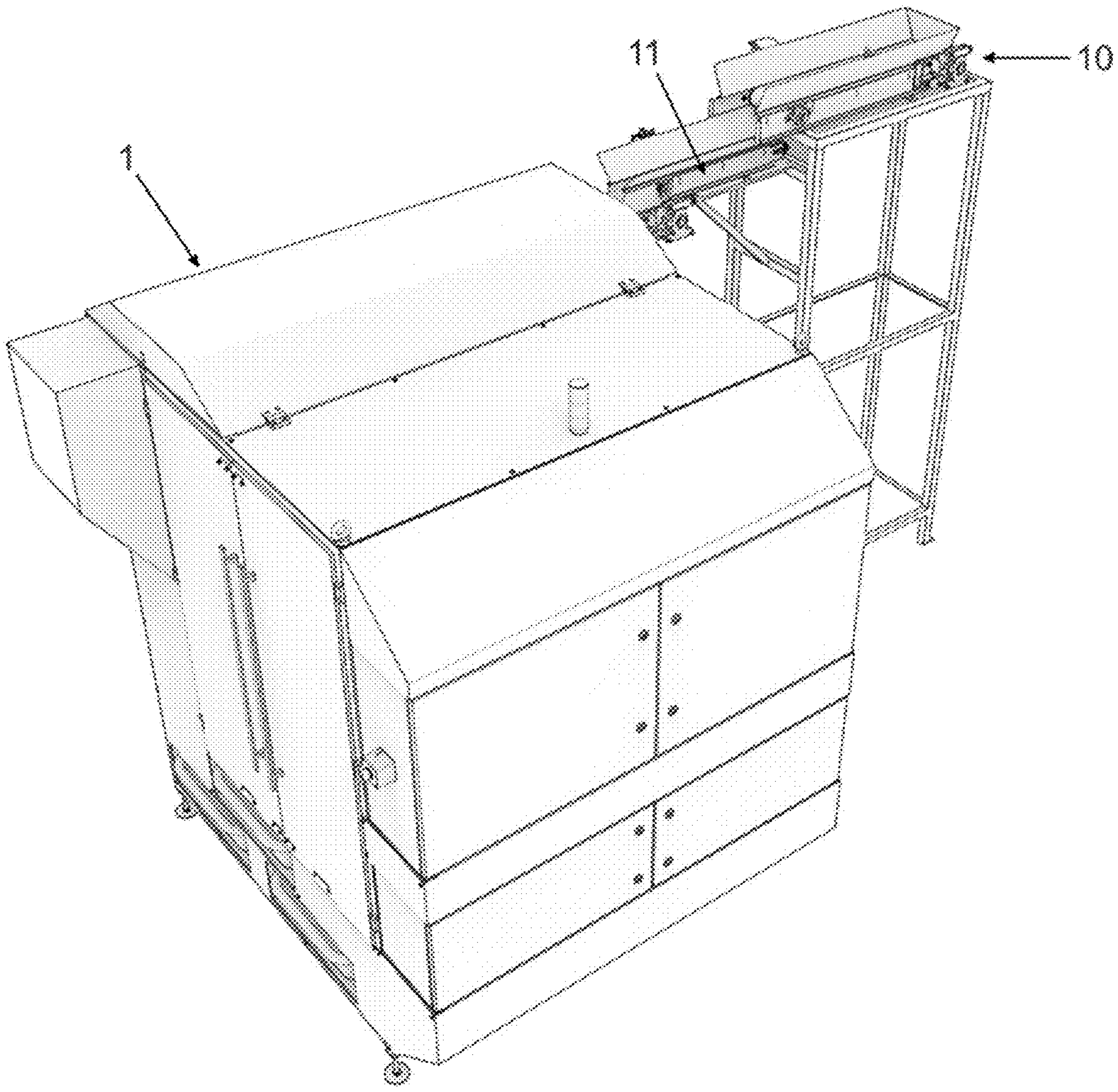
FIG. 2 shows a perspective view of the equipment.

This invention consists of equipment that transports birds using a conveyor belt system, and delivers each bird into an image capture head, in order to examine the sex and other characteristics of the birds, as shown in FIGS. 1 and 2.

Figure 3:
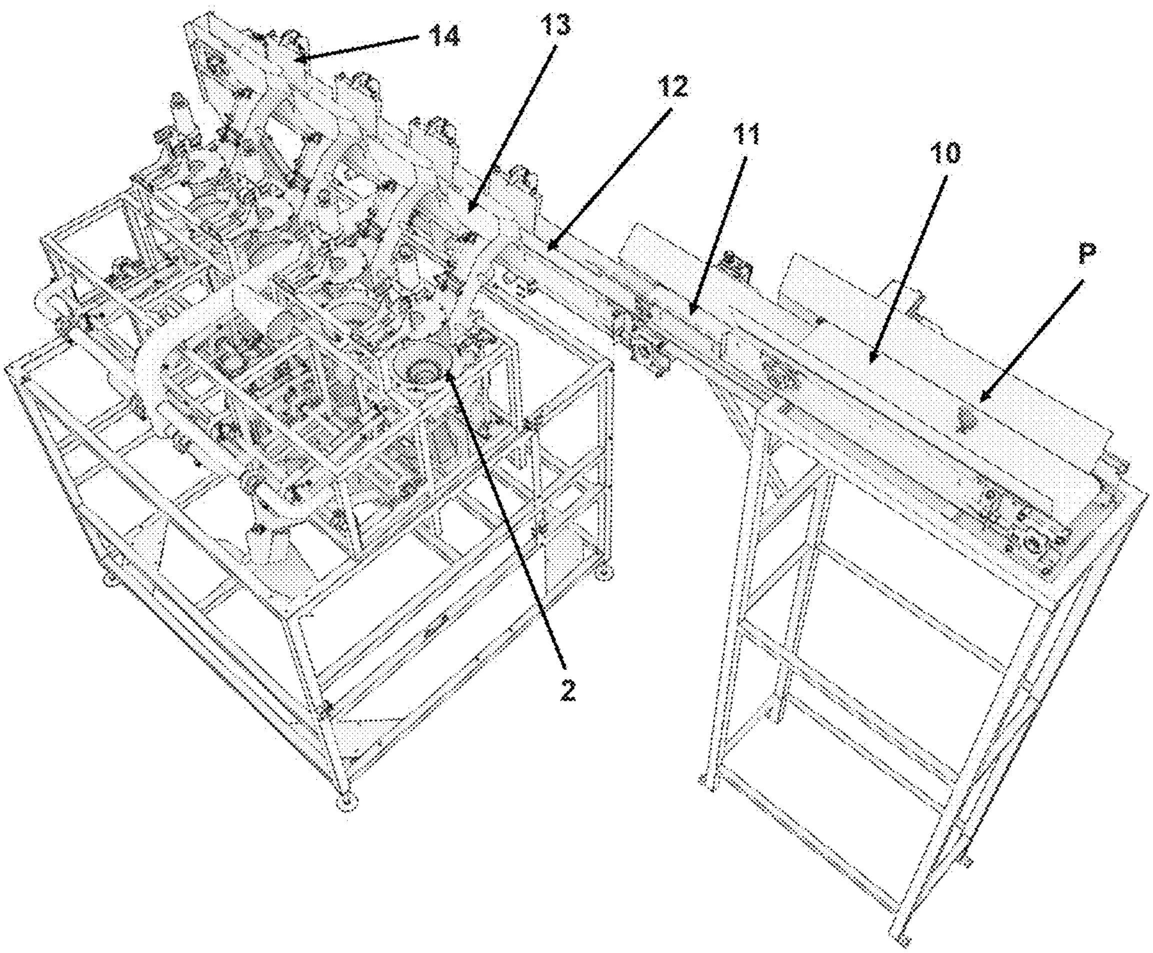
FIG. 3 shows a perspective view of the equipment, highlighting the image capture head system.
Figure 4:
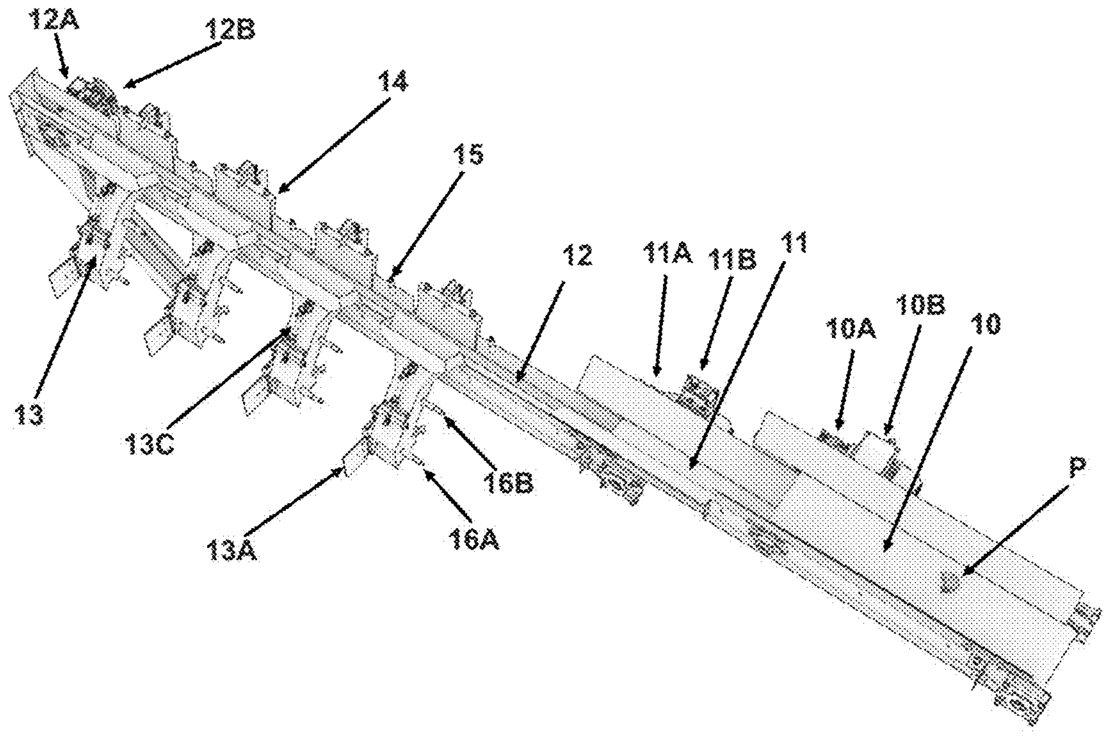
FIG. 4 shows a perspective view of the conveyor system.

The automatic delivery system, as illustrated in FIGS. 3 and 4, consists of a set of three conveyor belts (10) (11) (12), preferably 80 mm wide, sufficient to accommodate the birds in a single line. Depending on the facilities available, an inclined conveyor belt or other means of transporting the birds to conveyor belt (10) could be added.

The conveyor belts (10) (11) (12) are made of canvas, with an optional rough surface (called 'ergonomic') to prevent the birds from slipping while in motion or changing speed. The conveyors are driven individually by shafts connected to their respective transmission boxes (10A) (11A) (12A) and to their respective induction motors (10B) (11B) (12B). The speed of these motors is controlled by frequency inverters. Each conveyor operates at a different speed: the first conveyor (10) operates at a reduced speed—50% of the speed of conveyor (12); the second conveyor (11) at an intermediate speed—75% of the speed of conveyor (12); and the third conveyor (12) operates at high speed, between 0.5 and 1.5 m/s, but preferably 1 m/s.

Figure 5:
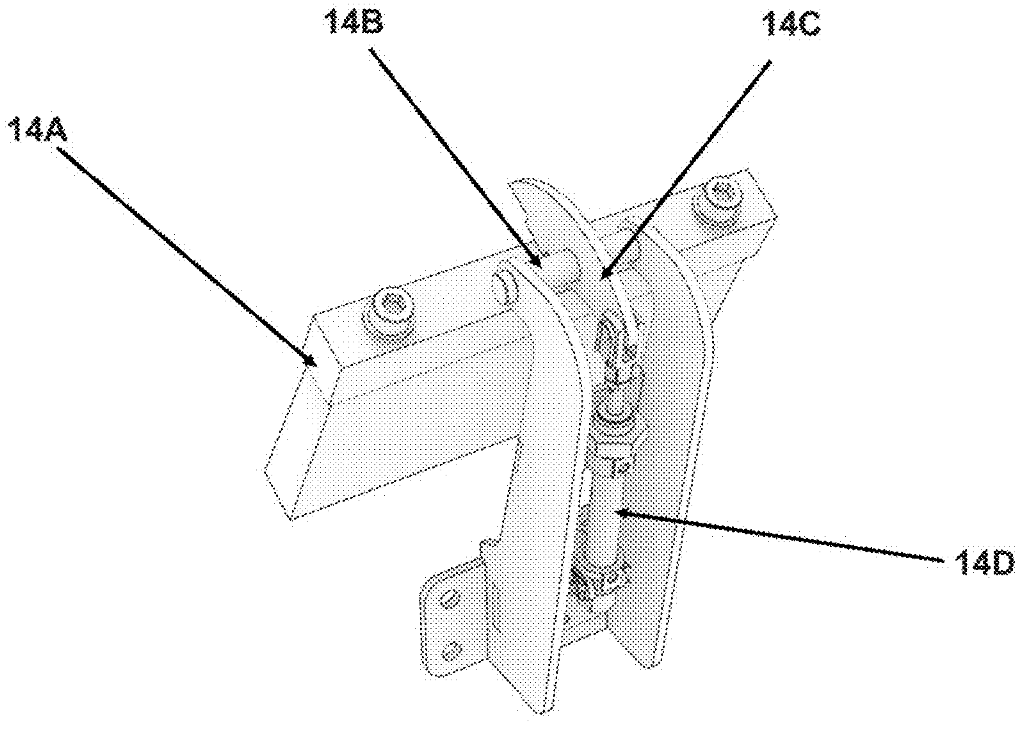
FIG. 5 shows a perspective view of the articulated flap system.

This speed configuration allows for the birds, which have to trigger photoelectric sensors (15) along the route, to be separated uniformly. When triggered, these sensors (15) activate an articulated flap system (14). The system has a rotation axis at its upper end (14B) and is fixed to a small lever arm (14C) that is connected to the rod of a pneumatic actuator (14D) and is activated by it, as illustrated in FIG. 5. The flap (14) is made of a rigid block (14A) of nylon with nylon bristles inserted into it (the block is solid with holes where the bristles, made of the same material, are inserted). This forms a kind of "broom" that is intended to push the birds without causing them any injury.

Figure 6:
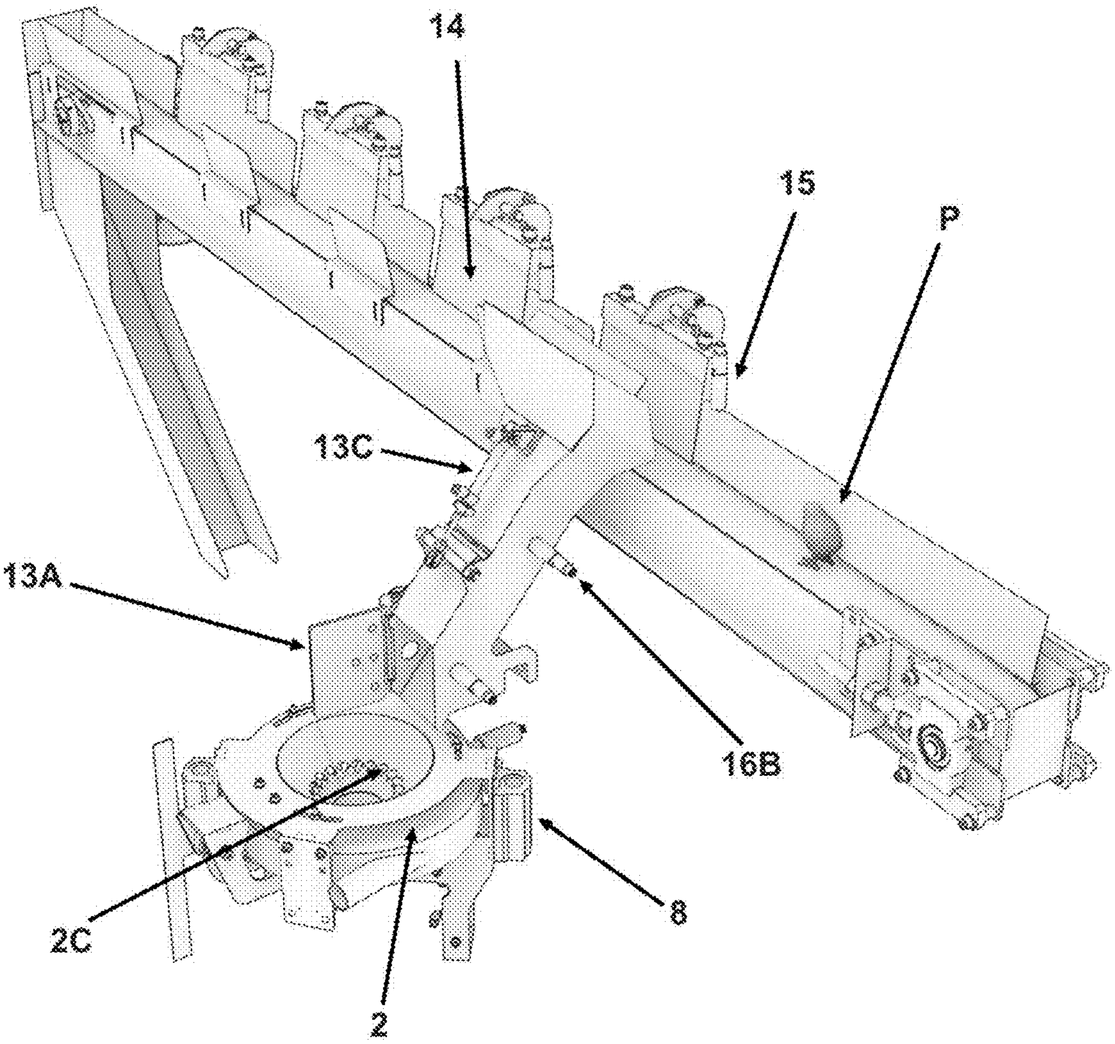
FIG. 6 shows a perspective view of the third conveyor belt, with integrated sensors and a system of articulated flaps that push the birds towards the heads.

The flap (14) is positioned at the side of the fast conveyor belt (12) parallel to its direction, and also in front of the entrance to the first buffer compartment (13), which is fixed to the opposite side of the conveyor belt (12), also parallel to its direction, as shown in FIG. 6. The flap (14) is responsible for directing the bird to the first buffer compartment (13), with a quick flick, pushing the bird (P) as it passes in front and directing it, therefore, into the first buffer (13).

Once the first buffer (13) is occupied, the Programmable Logic Controller (PLC) prevents the flap (14) from being activated again while the photoelectric sensor (16B) of the first buffer (13) indicates that it is occupied. Therefore, no more birds may enter until the space has been released; ensuring that only one bird at a time is allocated to a buffer section (13).

After a bird (P) is directed into the first buffer (13), the flap (14) returns to its starting position, allowing the next bird (P) to proceed along the conveyor belt (12) until it reaches the next sensor (15) and flap (14). This design ensures that the birds (P) can be separated and distributed efficiently, which provides an optimal individual, automated delivery system.

Figure 7:
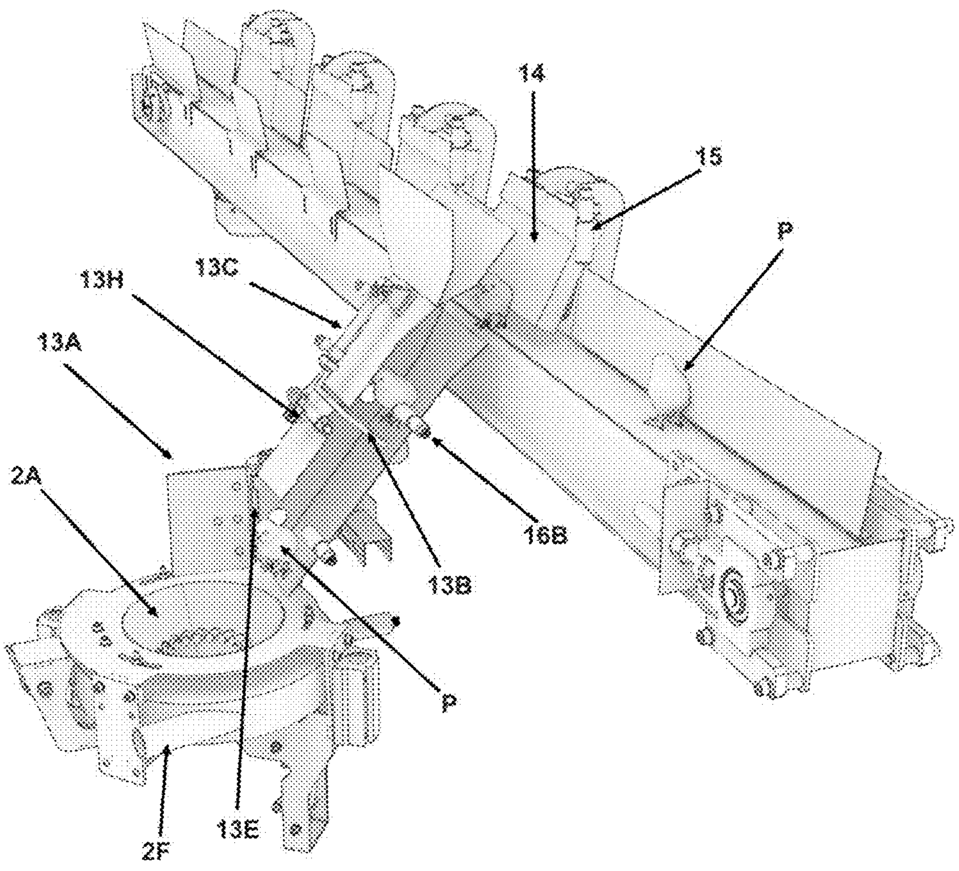
FIG. 7 shows a perspective view of the third conveyor belt, highlighting the buffer compartment attached to the head.

As illustrated in FIG. 7, the buffer mechanism (13) should preferably be constructed in a rectangular tubular shape, at an angle of 60° to the floor and divided into multiple levels or sections, physically separated by at least two flaps (13A) (13B) and each section should have a photoelectric sensor (16A) (16B) to detect the presence of birds. This sensor (16A) (16B) sends an electrical signal to the Programmable Logic Controller (PLC) to notify it that a bird (P) is in the respective section and indicate that that section is occupied.

Figure 8:
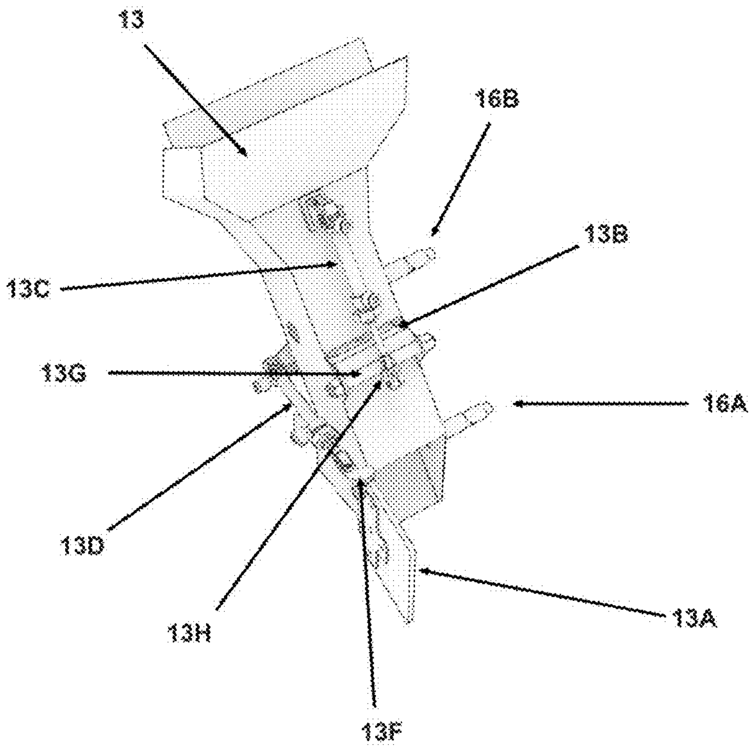
FIG. 8 shows a perspective view of the buffer compartment.

Each section is equipped with a flap to provide a divider between sections. These flaps (13A) (13B) are made of rubber to prevent injuring the birds. This rubber is rectangular and shaped to fit the buffer section, large enough to isolate the section. It is fixed by one edge to a metal shaft (13E) (13G), which in turn is attached to a small lever arm (13F) (13H) that is connected to the rod of a pneumatic actuator (13C) (13D), which operates the mechanism, as shown in FIG. 8.

The flaps (13A) (13B) act as dynamic dividers, allowing birds (P) to move from one section to another, while ensuring that only one bird (P) is in each section. They are transferred by opening one flap (13A) (13B) at a time, in sequence, starting with the flap (13A) for the last section, the one closest to the image capture head. When it is opened, the bird (P) falls down to the next section; then the flap (13A) is closed again. This process repeats successively for each buffer flap (13), allowing all of the birds (P) to advance one stage.

The flap (13A) located in the last section of the buffer (13) is vital, as it is responsible for directing the birds towards the image capture head (2). When a bird is released from the image capture head (2), an electrical signal is sent to the Programmable Logic Controller (PLC), which, in turn, starts advancing the birds through the buffer sections (13), thereby ensuring that new birds (P) are continually delivered to the image capture head (2).

Figure 9:
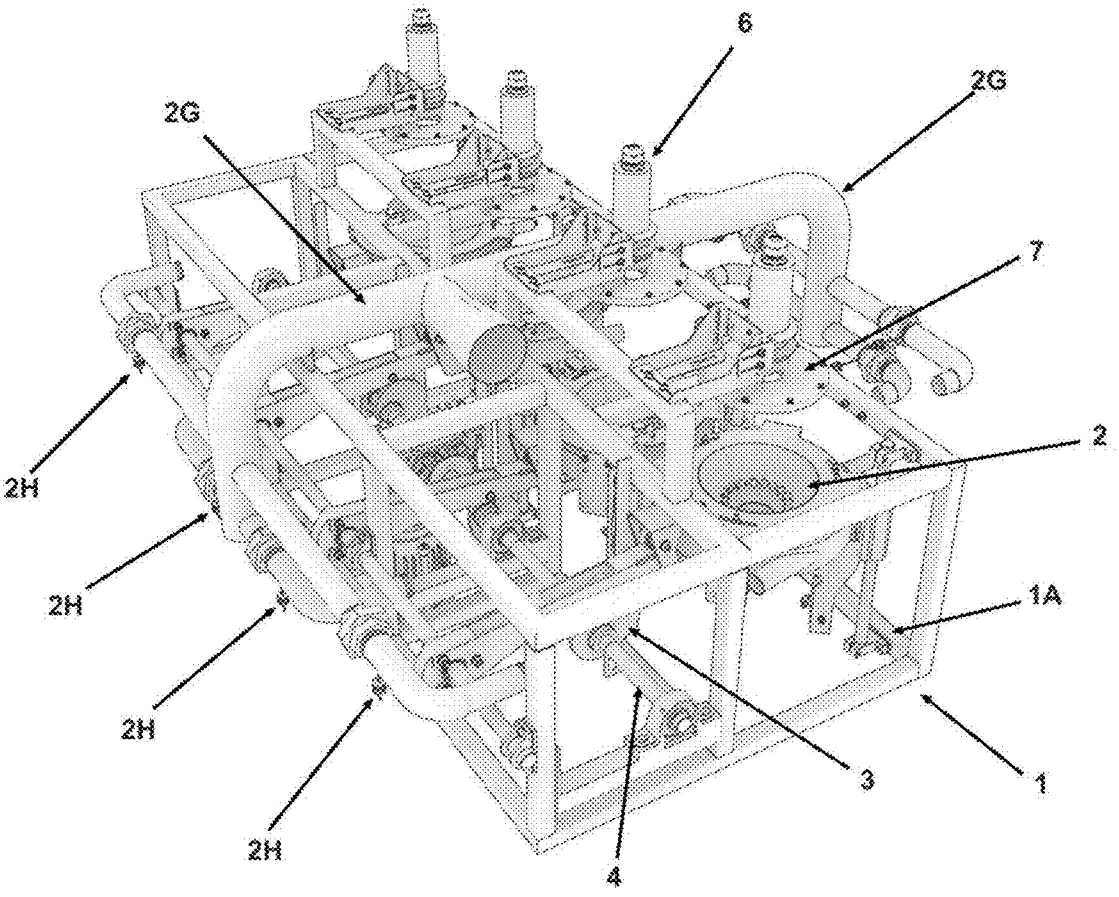
FIG. 9 shows a perspective view of the image capture head system.
Figure 10:
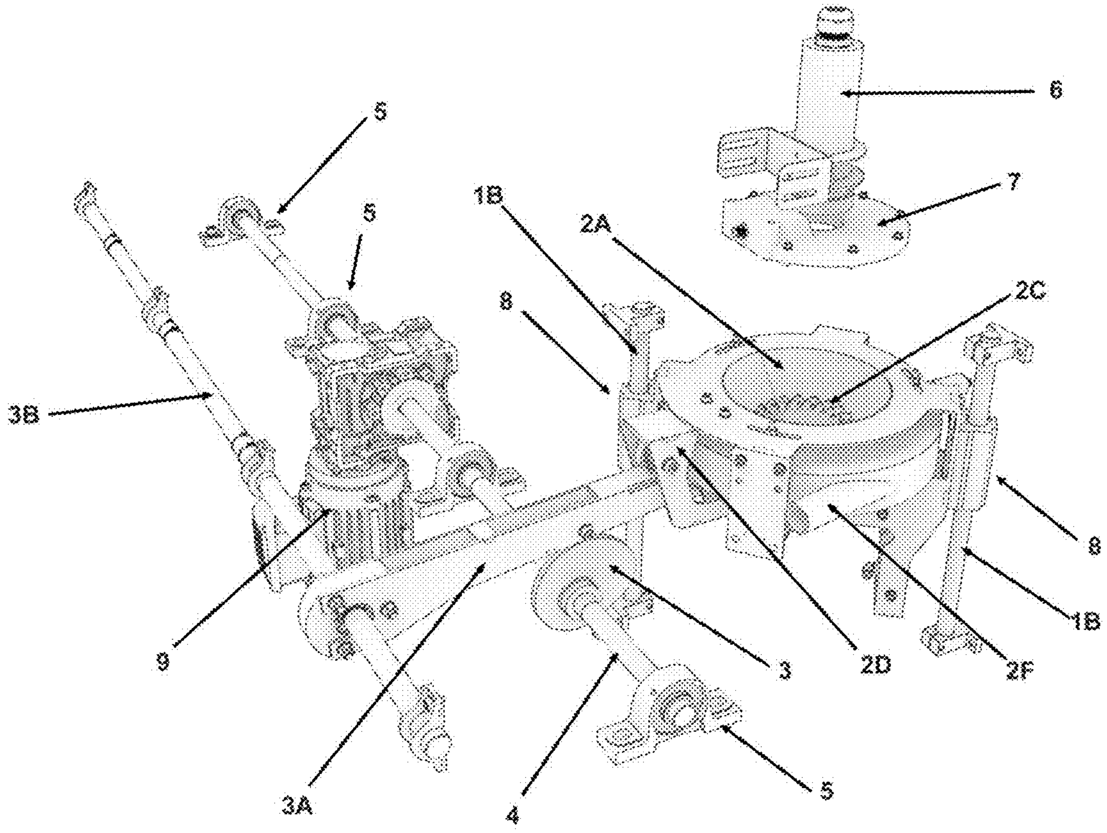
FIG. 10 shows a perspective view of an image capture head system.

As shown in FIGS. 9 and 10, the frame of the unit (1) includes a base (1A) that supports two vertical rails (1B) to allow the image capture head (2) to move. This centers and holds the birds (P) in place so that there is no variation in their X and Y positions. It has a number of warm air blowers (not illustrated) distributed evenly at angles, placed at an upward angle. The frame (1) also has a cam system (3) attached to a shaft (4) positioned by bearings (5) and driven by a motor (9), with a follower (3A) attached through bearings to a fixed shaft (3B) at one end and at the opposite end it supports the retaining structure of the head (2D). There is also a camera (6) and light source (7) positioned at the top center of the head (2). The image capture head (2) is fixed by its outer side to the guides (8) and attached to the rails (1B), which allow the component to move in a vertical direction. The birds (P) are delivered into the head (2) through the top (the opposite side to the hatch).

Figure 11:
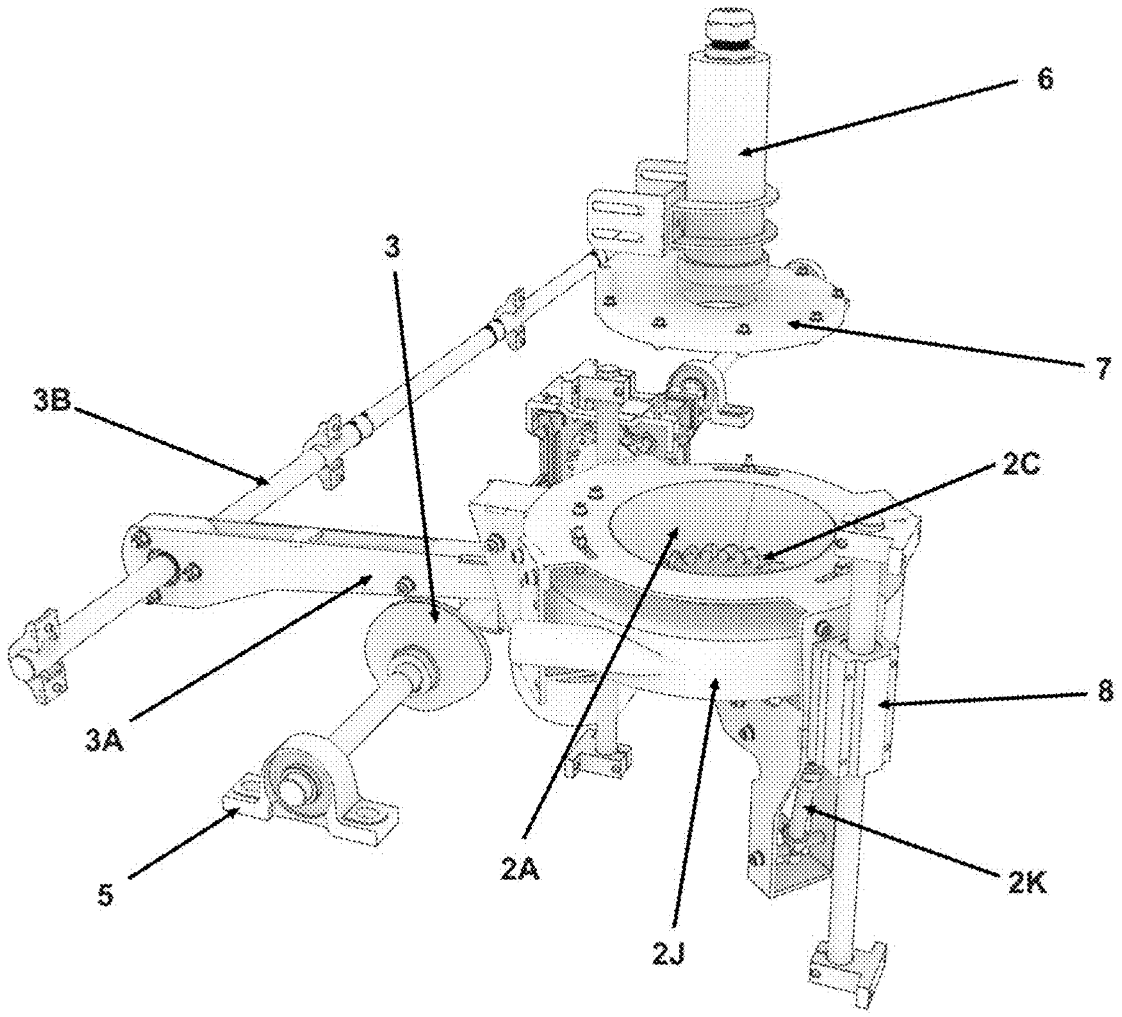
FIG. 11 shows a perspective view of an image capture head system.
Figure 12:
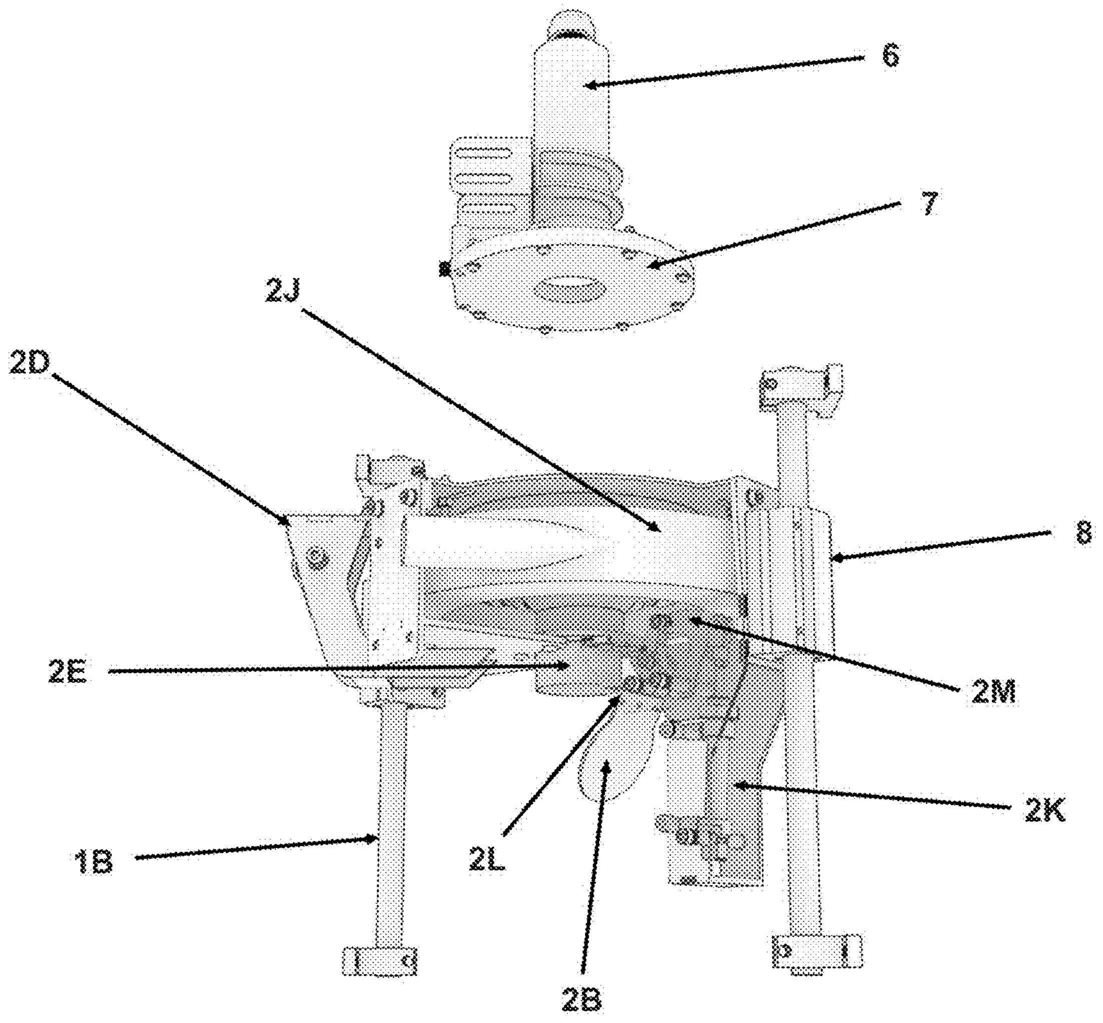
FIG. 12 shows a perspective view of an image capture head system.

As shown in FIGS. 11 and 12, the image capture head (2) is cylindrical and divided into two levels (2A) (2E) with different diameters. The first level (2A) has a bigger internal diameter and the inner chamber (2J) is in the shape of a ring to allow the air pumped through the holes (2C) on the inside surface of the head (2) to circulate. The air chamber is fed by the connections (2F) for the hoses (not illustrated), which in turn are connected to the air distribution pipe (2G). This is fed by a high airflow fan (not illustrated) and the temperature is controlled by an electric resistance system (2H). There are also holes (2C) arranged side by side along the diameter, pointing towards the geometric center of the head (2), on the side of the head with the larger internal diameter (2A). These are on its inside and connect the air chamber with the internal part of the head. The second level (2E) of the head (2) has a smaller internal diameter and is attached to the hatch (2B) for releasing the birds, which is fixed at one end to a metal shaft (2L). This shaft is attached to a lever arm (2M), which is connected to the rod of a pneumatic actuator (2K) that operates it. The hatch (2B) remains closed while the analysis is going on, sealing the hole in the head and keeping the bird (P) in place. Once the analysis is over, the trapdoor (2B) is opened to release the bird and then closed for the next examination.

The objective of the equipment is to give the bird (P) the sense that it is falling, while allowing it to keep its feet in contact with the floor, so that one bird at a time enters the image capture head (2). This then moves up and down several times until the system has obtained an image suitable for sexing. It is important that the equipment moves up and down at a constant speed so that the birds' wings open naturally, as if it was falling, but not so fast as to be uncomfortable, unsafe or eject the bird out of the image capture head. As the blowers make contact with the bird's wings, the finest down opens up, which exposes the stiffer feathers so that they can be photographed. While the vertical motion of the image capture head causes them to open their wings. The method designed is for analyzing the photographs and determining the bird's sex. This is a comparison of the photos taken with data already contained in the database.

A trigger (not illustrated) is used to activate the camera (6) so that it takes at least 2 images of each bird during the downward motion of the image capture head (2).

Once the image capture stage (that which takes place in the head (2)) is complete, the hatch (2B) is opened and the bird (P) is allowed to fall into the three-position directing mechanism (17) that is responsible for sending the bird to the dispatch module.

Figure 13:
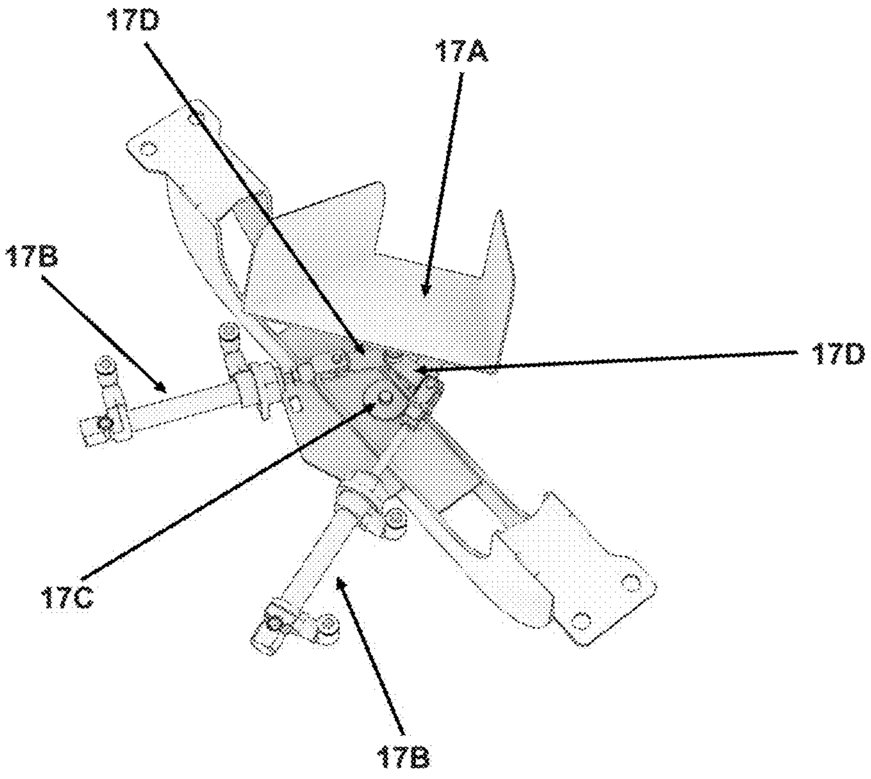
FIG. 13 shows a perspective view of the directing mechanism.

As illustrated in FIG. 13, the directing mechanism (17) is formed by a "U" shaped tube (17A) and fixed at an angle of 60° to the floor. The base width of the entrance at the top is 1.6 times that of the exit at the bottom, which should preferably have an opening of 80 mm. This forms a funnel. The underside of this chute (17A) is fixed to a rotating vertical shaft (17C) which allows it to rotate horizontally. This rotating vertical shaft is connected to two lever arms (17D) with an angle of 45° between them. These lever arms in turn, are connected at their opposite ends to two pneumatic actuators (17B), one for each arm, which allow the chute to be rotated into three fixed positions—-45°, 0° and 45°. This rotation is controlled by the Programmable Logic Controller (PLC), which activates the actuators (17B) to rotate to the correct position according to the result of the sexing analysis, i.e. they only rotate once the system has identified the sex of the bird.

Figure 14:
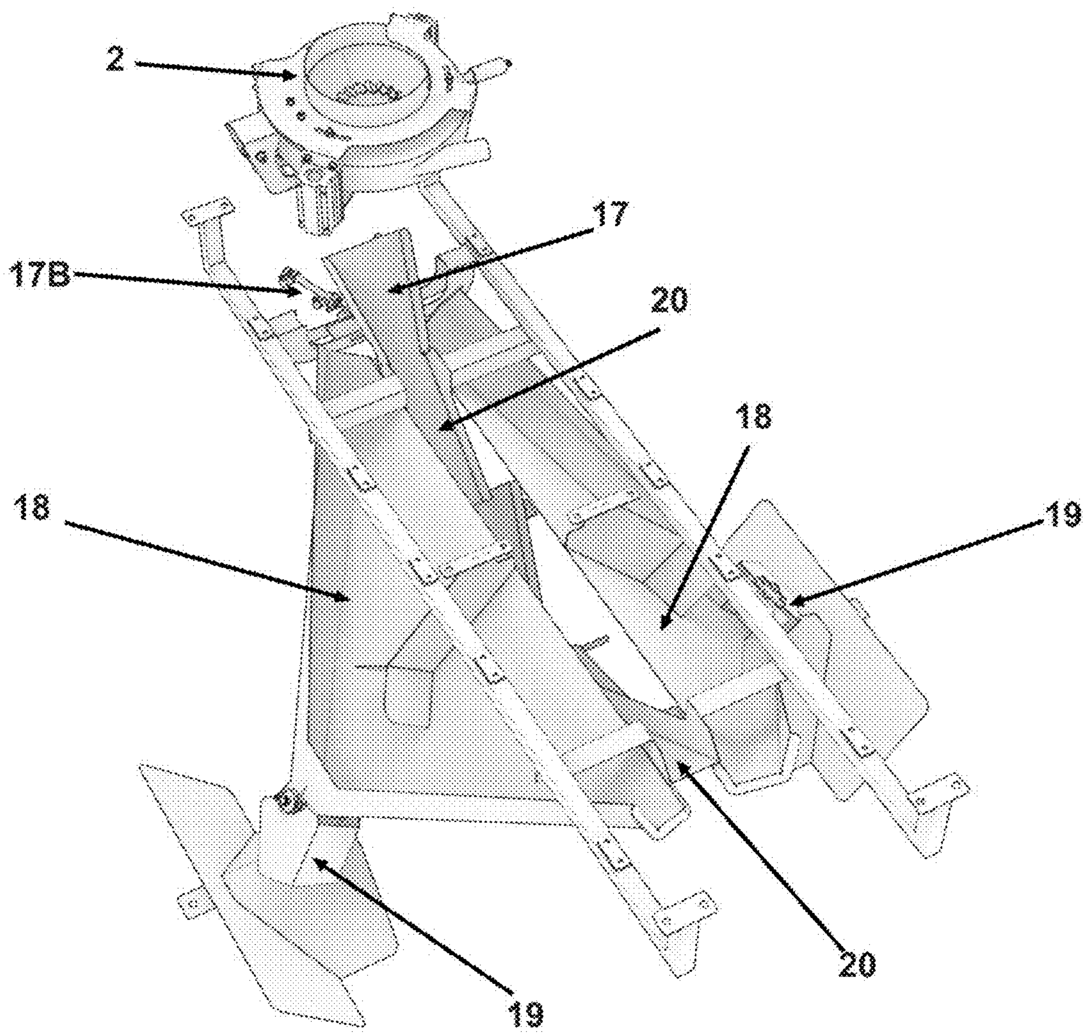
FIG. 14 shows a perspective view of the head attached to the three-position directing mechanism that pushes the birds to the dispatch module.

The dispatch module is adaptable and has several possible configurations. One dispatch option is to allocate them by crate, as illustrated in FIG. 14. In this arrangement, the birds coming from the three-position directing mechanism (17) slide down individual chutes (18) (20) in one of each of the three positions of the directing mechanism. These finally lead to the appropriate allocated bird crate, via a two-position selector funnel system (19). The upper end of this is fixed to two bearings, which act as a reference rotating shaft. The selector funnel (19) has a metal shaft on its rear side, connected to a pneumatic actuator that operates it (this is not illustrated in the figure because it is on the opposite side). This system allows the birds (P) to drop into the appropriate crate, until it reaches its maximum capacity. Once it is full, the selector funnel (19) changes its direction and fills the next crate. Each exit from the three-position directing mechanism (17) is linked to a two-position selector chute (19), and, therefore, to a respective allocated crate. This segregates the birds after they have already been separated according to sex or for re-analysis.

Another dispatch option is to allocate the birds by conveyors (not illustrated): In this configuration, the birds (P) are transferred from the three-position directing mechanism (17) directly onto conveyor belts (not illustrated). The belts should preferably be 80 mm and sufficient to accommodate the birds (P) in single file. The conveyor belts are made from canvas, preferably with a rough surface (called 'ergonomic'), to prevent the birds from slipping while in motion. The conveyors are driven by separate shafts, attached via respective transmission boxes (not illustrated) to respective induction motors (not illustrated). The speed of the motors is controlled by frequency inverters. Each position of the three-position directing mechanism (17) corresponds to a specific destination, based on sex or the need for re-analysis.

This ensures the birds are appropriately separated for the next stages of the production process.

The method for analyzing the sex and individual characteristics of birds therefore comprises the following steps:

a) The birds (P) are placed on conveyor (10), which operates at 50% of the speed of conveyor (12);

b) The birds (P) are transported in a single file to conveyor (11), which operates at 75% of the speed of conveyor (12);

c) The birds (P) are transported to the third conveyor (12), which operates at between 0.5 and 1.5 m/s, but preferably at 1 m/s. As the birds (P) are transferred from one conveyor to another they are evenly separated, as each section runs at a higher speed;

d) When the photoelectric sensors (15) along the path of conveyor (12) detect the birds, they activate an articulated flap system, (14), which pushes and directs the birds (P), individually, into the first buffer compartment (13);

e) When the first section of the buffer (13), separated by flap (13B), is identified by the sensor (16B) as being occupied, the sensor sends an electrical signal to the Programmable Logic Controller (PLC), which prevents flap (14) from being activated again and preventing any more birds (P) entering, until the section is empty again;

f) The flap (14) returns to its original position, allowing the next bird (P) to continue down the conveyor belt (12) until it reaches the next sensor (15) and flap (14);

g) When the sensor (16A) identifies that the section separated by flap (13A) is empty, it sends an electrical signal to the Programmable Logic Controller (PLC) to allow flap (13B) to open. The bird (P) falls down into the next section and flap (13A) remains closed;

h) When the Programmable Logic Controller (PLC) is informed that the hatch (2B) has been opened by the pneumatic actuator (2K), it concludes that the image capture head (2) is empty, and once the hatch (2B) has been closed again, it allows flap (13A) to open. This releases a bird (P) to fall into the image capture head (2) for the next analysis. This process is then repeated successively, so that all the birds (P) in the buffer sections (13) move along one stage, and new birds (P) continue to be delivered into the image capture head (2);

i) When a bird is inside the image capture head (2), the blowers, which have already been activated, keep the fine down on the bird's wings open;

j) While step i) is going on, the image capture head (2) moves vertically, and when it passes the trigger, the component sends an electrical signal to the Programmable Logic Controller (PLC) to activate the camera (6), which then takes at least 2 photographs;

k) When each photograph is taken, the image is stored in the running memory and compared with the information learned and retained by the sexing algorithm, so that the system can make a decision and indicate whether the bird is male or female or rule on the specific individual characteristics under analysis;

l) After the image capture stage, which takes place in the image capture head (2), the hatch (2B) is opened, and then the bird (P) is released into the three-position directing mechanism (17), which then sends it towards the dispatch module.

Optionally, before beginning step a), the process could include transporting the birds on an inclined conveyor or another means, to deposit them on conveyor belt (10), depending on the facilities available.

In step l), the birds (P) coming from the three-position directing mechanism (17) are allowed to slide down separate chutes (18) (20), one for each of the three positions of the directing mechanism, to distribute them into the appropriate allocated crate, via a two-position selector funnel system (19). Once the box is full, the selector funnel (19) turns to fill up the next crate. Each outlet from the three-position directing mechanism (17) leads to a two-position selector chute (19), and, from there, into the appropriate crate, thereby segregating the birds after they have had their sex identified or this needs revisiting.

In step l), the birds (P) can be transferred from the three-position directing mechanism (17) directly onto conveyors. These are sufficient to allow a single row of birds; and each position of the three-position directing mechanism (17) will send them to a specific destination, according to their sex or the need to revisit the analysis. This sends the birds ready for the next stage of the production process.

It is important to stress that the images and the description are not intended to definitively limit the method for implementing the proposed inventive concept. They are, rather, to illustrate and explain the conceptual innovations of this solution. Therefore, the descriptions and images should be viewed as illustrative only and not definitive. There may be other equivalent or similar ways to implement the inventive concept described here, which do not deviate from the protected scope outlined in this proposed solution.

The invention claimed is:

1. An automatic delivery system for sexing and analyzing individual characteristics of birds comprising:

a first conveyor belt (10) made of canvas with a width of 80 mm and operating at a reduced speed of 50% of a speed of a third conveyor belt (12), the first conveyor belt (10) comprising:
- a first transmission box (10A); and
- a first induction motor (10B) having speed controlled by a first frequency inverter, wherein the first transmission box (10A) and the first induction motor (10B) are connected to a first shaft to drive the first conveyor belt (10);

a second conveyor belt (11) made of canvas with a width of 80 mm and operating at an intermediate speed of 75% of the speed of the third conveyor belt (12), the second conveyor belt (11) comprising:
- a second transmission box (11A); and
- a second induction motor (11B) having speed controlled by a second frequency inverter, wherein the second transmission box (11A) and the second induction motor (11B) are connected to a second shaft to drive the second conveyor belt (11);

the third conveyor belt (12) made of canvas with a width of 80 mm and operating at a speed between 0.5 and 1.5 m/s, the third conveyor belt (12) comprising:
- a third transmission box (12A);
- a third induction motor (12B) having speed controlled by a third frequency inverter, wherein the third transmission box (12A) and the third induction motor (12B) are connected to a third shaft to drive the third conveyor belt (12); and
- photoelectric sensors (15) to activate an articulated flap system (14);

the articulated flap system (14) positioned at a side of the third conveyor belt (12), parallel to a direction of movement of the third conveyor belt (12) and in front of an entrance to a buffer compartment (13), the articulated flap system (14) comprising:

a rigid block (14A) of nylon with nylon bristles;

an upper end (14B) with a rotation axis;

a small lever arm (14C) fixed to the upper end (14B);

a rod of a pneumatic actuator (14D) connected to the small lever arm (14C) to activate the small lever arm (14C);

the buffer compartment (13) fixed to another side of the third conveyor belt (12) opposite the articulated flap system (14) and parallel to the direction of movement of the third conveyor belt (12), wherein the buffer compartment (13) is constructed in a rectangular tubular shape at an angle of 60° to a floor, the buffer compartment (13) comprising:

at least two flaps (13A), (13B) that are rectangular, made of rubber, and made to fit the buffer compartment (13) to physically separate and isolate multiple sections within the buffer compartment (13), each of the multiple sections having a photoelectric sensor (16A), (16B) to detect a presence of birds, wherein a last flap (13A) of the at least two flaps (13A), (13B) is located in a last section of the buffer compartment (13) and is integrated into an image capture head (2), and wherein the photoelectric sensor (16A), (16B) sends an electrical signal to a programmable logic controller (PLC) to indicate that a bird (P) is in the respective section and that the respective section is occupied;

at least two metal shafts (13E), (13G), each fixed to a respective edge of the at least two flaps (13A), (13B);

at least two small lever arms (13F), (13H) attached to the at least two metal shafts (13E), (13G), respectively; and rods of at least two pneumatic actuators (13D), (13C) connected to the at least two small lever arms (13F), (13H), respectively;

the image capture head (2), wherein the image capture head (2) is cylindrical and is divided into a first level (2A) and a second level (2E) with the first level (2A) having an internal diameter that is bigger than an internal diameter of the second level (2E), the image capture head (2) comprising:

an outer side fixed to guides (8) and attached to two vertical rails (1B);

a hatch (2B) having one end fixed to a metal shaft (2L), wherein the hatch (2B) interfaces with the second level (2E) to remain closed and seal a hole of the second level (2E) while an analysis is going on to keep the bird (P) in place, to open to release the bird (P) when the analysis is over, and to close again for the next examination;

a lever arm (2M) attached to the metal shaft (2L);

a rod of a pneumatic actuator (2K) connected to the lever arm (2M) to operate the hatch (2B);

a top side opposite the hatch (2B) to receive delivery of the bird (P);

an inner chamber (2J) in the shape of a ring;

connections (2F) for hoses that are connected to the inner chamber (2J), wherein the connections (2F) for the hoses are fed air;

holes (2C) arranged side by side along an inner surface of the first level (2A) and pointing towards a geometric center of the image capture head (2), wherein the air is pumped from the connections (2F) through the holes (2C) via the inner chamber (2J) to be circulated;

an air distribution pipe (2G) connected to the connections (2F) for the hoses, wherein the air distribution pipe (2G) is fed by a high airflow fan with temperature controlled by an electric resistance system (2H);

a retaining structure (2D); and a number of warm air blowers distributed evenly at angles and placed at an upward angle;

a frame (1) comprising:

the two vertical rails (1B) receiving the guides (8) to allow the image capture head (2) to move in a vertical direction; and a base (1A) to support the two vertical rails (1B);

a camera (6) positioned at a top center position of the image capture head (2), wherein a trigger is used to activate the camera (6) to take at least two photographs of the bird (P) during a downward motion of the image capture head (2);

a light source (7) positioned at the top center position of the image capture head (2);

a cam system (3) attached to a shaft (4) positioned by bearings (5) and driven by a motor (9);

a follower (3A) having one end attached to a fixed shaft (3B) through the bearings (5) and an opposite end to support the retaining structure of the image capture head (2D); and a three-position directing mechanism (17) linked to an opening of the hatch (2B) to send the bird (P) to a dispatch module, the three-position directing mechanism comprising:

a chute (17A) having a "U" shape that forms a funnel, is fixed at an angle of 60° to the floor, and comprises an entrance with a width that is 1.6 times a width of an exit, wherein the width of the exit is 80 mm;

a rotating vertical shaft (17C) that is fixed to an underside of the chute (17A) to cause the underside of the chute (17A) to rotate horizontally and that is connected to two lever arms (17D); and the two lever arms (17D) separated by an angle of 45° and each having opposite ends connected to two pneumatic actuators (17B), respectively, to allow the chute (17A) to rotate into three fixed positions of 45°, 0° and 45°, wherein the programmable logic controller (PLC) activates the two pneumatic actuators (17B) to rotate the chute (17A) to a correct position.

2. The automatic delivery system according to claim 1, wherein the first conveyor belt (10), the second conveyor belt (11), and the third conveyor belt (12) each have a rough surface.

3. The automatic delivery system according to claim 1, further comprising an inclined conveyor to transport the birds to the first conveyor belt (10).

4. The automatic delivery system according to claim 1, wherein the dispatch module is used to allocate the birds by crate, the automatic delivery system further comprising:

individual chutes (18) that lead from each of the three fixed positions of the three-position directing mechanism (17); and a two-position selector funnel system (19) linked to each exit from the three-position directing mechanism (17), the two-position selector funnel system (19) comprising:

an upper end fixed to two bearings to act as a reference rotating shaft; and a metal shaft on a rear side, connected to a pneumatic actuator to operate the two-position selector funnel system (19).

5. The automatic delivery system according to claim 1, wherein the dispatch module is used to allocate the birds to conveyor belts, the automatic delivery system further comprising:

the conveyor belts, wherein each conveyor belt has a width of 80 mm, is made from canvas, and has a rough surface;

shafts, attached to each respective conveyor belt, via respective transmission boxes to respective induction motors, wherein the shafts drive the conveyor belts; and frequency inverters to control speed of the respective induction motors.

6. A method for sexing and analyzing individual characteristics of birds using the automatic delivery system of claim 1, the method comprising:

a) placing the birds on the first conveyor (10);

b) transporting the birds in a single file to the second conveyor (11);

c) transporting the birds to the third conveyor (12);

d) in response to the photoelectric sensors (15) along a path of the third conveyor (12) detecting the birds, activating the articulated flap system (14) to push and direct the birds, individually, into the first buffer compartment (13);

e) in response to the photoelectric sensor (16B) determining a first section of the buffer compartment (13), separated by a first flap (13B) of the at least two flaps (13A), (13B), is occupied, sending an electrical signal to the programmable logic controller (PLC) to prevent the articulated flap system (14) from being activated again and to prevent more birds from entering the first section until the first section is empty again;

f) returning the articulated flap system (14) to an original position to allow the next bird to continue down the third conveyor belt (12) until the next bird reaches the photoelectric sensor (15) and the articulated flap system (14);

g) in response to determining that the last section of the buffer compartment (13), separated by the last flap (13A) of the at least two flaps (13A), (13B), is empty, sending an electrical signal to the programmable logic controller (PLC) to allow the first flap (13B) to open such that the bird is released down into the last section while the last flap (13A) remains closed;

h) in response to the programmable logic controller (PLC) determining that the hatch (2B) has been opened by the pneumatic actuator (2K), the image capture head (2) is empty, and the hatch (2B) has been closed again, allowing the last flap (13A) to open such that the bird is released into the image capture head (2);

i) maintaining fine down on wings of the bird in an open position using the warm air blowers when the bird is inside the image capture head (2);

j) moving the image capture head (2) vertically, and in response to the image capture head (2) passing the trigger, sending an electrical signal to the programmable logic controller (PLC) to activate the camera (6) to take the at least two photographs;

k) storing the at least two photographs in running memory and comparing the at least two photographs with information learned and retained by a sexing algorithm to determine a sex of the bird or rule on the individual characteristics under analysis;

l) opening the hatch (2B) to release the bird into the three-position directing mechanism (17) to send the bird towards the dispatch module.

7. The method according to claim 6, before beginning step a), further comprising transporting the birds on an inclined conveyor to deposit the birds on the first conveyor belt (10).

8. The method according to claim 6, wherein step l) further comprises:

releasing the birds down separate chutes (18), (20), one for each of the three fixed positions of the three-position directing mechanism (17), to distribute the birds into an appropriate allocated crate, via a two-position selector funnel system (19); and in response to determining the appropriate allocated crate is full, turning the two-position selector funnel system (19) to fill up a next crate, wherein each outlet from the three-position directing mechanism (17) leads to the separate chutes (18), (20) of the two-position selector system (19), and, from there, into the appropriate allocated crate, to segregate the birds into birds that have been identified and birds that are to be reevaluated.

9. The method according to claim 6, wherein step l) further comprises:

transferring the birds from the three-position directing mechanism (17) directly onto conveyor belts that are of sufficient size to accommodate a single row of birds wherein each position of the three-position directing mechanism (17) will send the birds to a specific destination, according to the sex or the need to revisit the analysis of each bird.

* * * * *